United States Patent [19]

Mather, Jr.

[11] 4,002,160
[45] Jan. 11, 1977

[54] SOLAR ENERGY COLLECTION SYSTEM
[75] Inventor: George R. Mather, Jr., Toledo, Ohio
[73] Assignee: Owens-Illinois, Inc., Toledo, Ohio
[22] Filed: Feb. 12, 1975
[21] Appl. No.: 549,291
[52] U.S. Cl. .............................. 126/271; 237/1 A
[51] Int. Cl.² .......................................... F24J 3/02
[58] Field of Search ........... 126/270, 271; 237/1 A; 62/2; 165/48, 47, 142; 350/288, 299

[56] References Cited

UNITED STATES PATENTS

| 980,505 | 1/1911 | Emmet | 126/271 |
| 2,213,894 | 9/1940 | Barry | 126/271 |
| 3,390,672 | 7/1968 | Snelling | 126/271 |

FOREIGN PATENTS OR APPLICATIONS

| 1,243,221 | 4/1960 | France | 126/271 |

Primary Examiner—Kenneth W. Sprague
Assistant Examiner—James C. Yeung
Attorney, Agent, or Firm—Steve M. McLary; E. J. Holler

[57] ABSTRACT

A multiple tube solar energy collector having a diffusely-reflecting surface positioned behind the collector tube array. Multiple double walled collector tubes are connected into a manifold for circulation of a working fluid through them. The working fluid is heated by solar energy as it flows through the tubes. A diffusely-reflecting surface behind the tubes reflects back to the tubes both direct beam and diffuse solar radiation which fails to strike the tubes directly. This system allows efficient operation of a tubular solar energy collector without requiring focusing or polished reflecting surfaces. The tubes are preferably no more than four tube diameters apart, on centers, and no more than four tube diameters above or separated from the diffuse-reflecting surface.

7 Claims, 4 Drawing Figures

SOLAR ENERGY COLLECTION SYSTEM

BACKGROUND OF THE INVENTION

This invention generally relates to solar energy collectors. More particularly, this invention relates to a solar energy collector of the type using an array of tubular collector elements. Specifically, this invention relates to such a solar energy collector which has a specific relationship of tube spacing to tube diameter and of tube distance from a diffusely-reflecting surface.

The use of tubular collector arrays for the collection of solar energy is known in the art. See, for example, U.S. Pat. Nos. 980,505 and 2,133,649. I have found that a diffuse-reflecting surface positioned behind a tubular solar energy collector array can significantly increase the efficiency. See U.S. Pat. No. 2,213,894 for an example of a diffuse reflector in the prior art. I have further found that if the tubes are spaced no farther apart than four tube diameters on centers and no more than four tube diameters away from the diffuse-reflecting surface, that maximum efficiencies may be achieved.

SUMMARY OF THE INVENTION

My invention is a solar energy collector. This collector includes a manifold. The invention also includes a plurality of double-wall tubular members. The space between the walls is sealed at a sub-atmospheric pressure. The tubular members each have a closed end remote from the manifold and an open end in sealing engagement with the manifold. The outer wall of the double-wall tubular members is a transparent glass material which is transparent about its entire circumference. The double-wall tubular members are all spaced apart on centers no more than four times the diameter of the double-wall tubular members. A means is provided for supplying a fluid media from the manifold to the interior of the plurality of tubular members and for returning the fluid media to the manifold. A diffuse-reflecting surface is positioned on the side of the tubular members away from the sun, the diffuse-reflecting surface being co-extensive with all of the tubular members. The diffuse-reflecting surface is positioned no more than four times the diameter of the tubular members away from the center line of the tubular members.

DETAILED DESCRIPTION OF THE DRAWINGS

Figure 1:
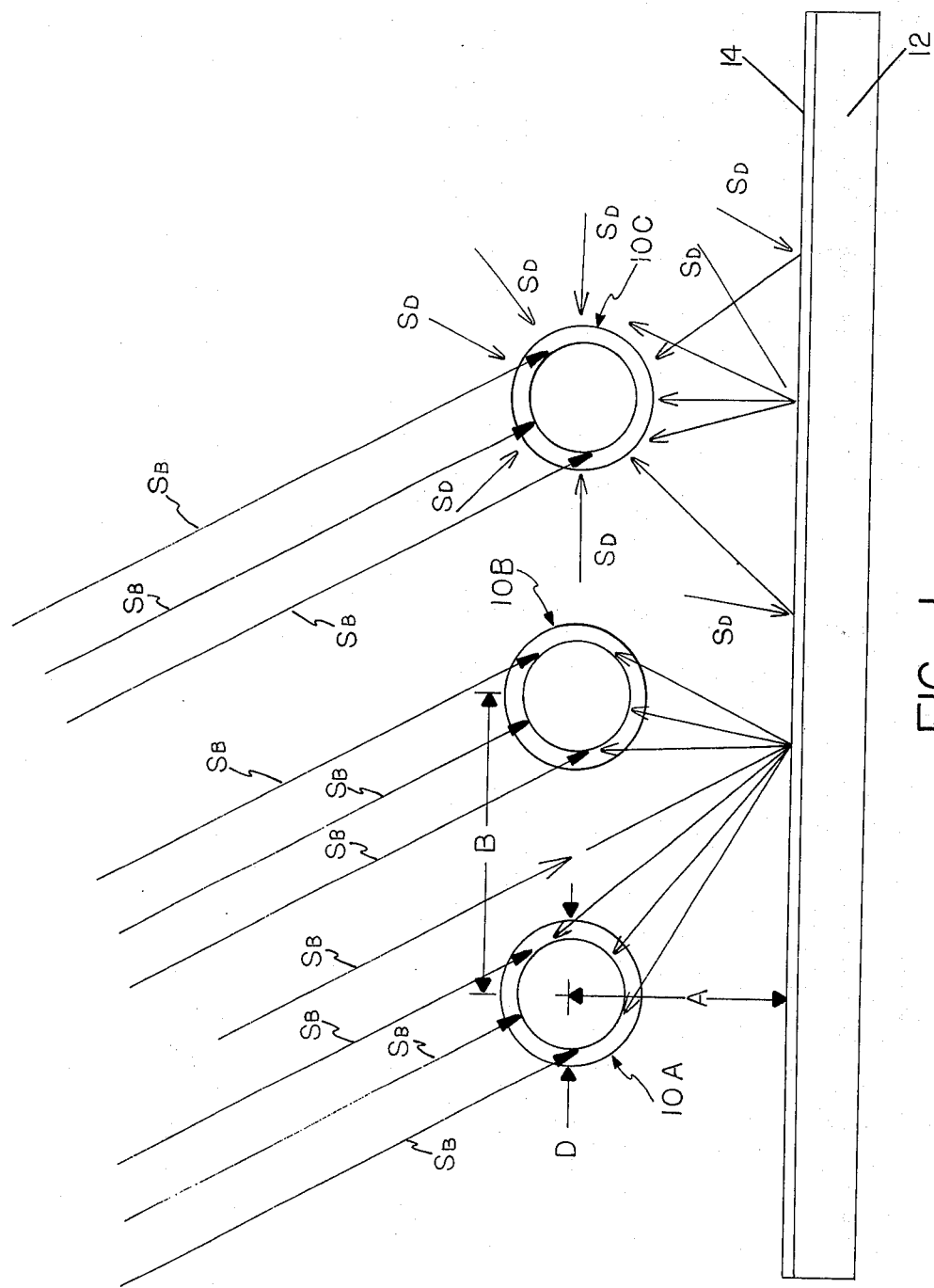
FIG. 1 is a schematic side elevational view of a tubular solar collector illustrating the present invention and its operational principles.

FIG. 1 illustrates in a very schematic fashion the basic principles upon which the present invention operates. As is well known, solar radiation is made up of two primary components. There is a component designated as $S_B$ which is incident upon the surface of the earth from the position of the sun at any given time. The component $S_B$ is a collimated beam of light, in FIG. 1 shown at an angle of about 60° from the horizontal. An additional component of the total solar energy available is a diffuse-radiation component designated as $S_D$. This component is not collimated and the rays are not parallel, but rather this component is available at a surface from many directions. In the case of a flat plate collector, the major energy absorption takes place at the time when the beam $S_B$ is overhead or at solar noon. At this time, there is no loss of available energy to a flat surface as a result of the beam $S_B$ being inclined due to diurnal effects as shown in FIG. 1. Throughout the day, the beam $S_B$ moves in response to the relative motion of the sun. Particularly during the winter in areas away from the equator, the sun's position is lower in the sky thus making the angle at which the beam $S_B$ strikes a horizontal flat surface lower thereby causing loss in energy available to a horizontal flat surface as a result of the angular incident of the beam $S_B$. This problem may be solved to some extent by inclining a flat collector or array to compensate for the sun's elevation. Despite this deficiency, for a given area covered with a solar energy-absorbing array, the flat plate allows the maximum availability of energy for absorption as versus an array of tubular collectors. However, arrays of tubular collectors offer significant advantages in that such an array is capable of operating at a higher output temperature than is the flat plate type collector and in that the weight and expense of a tubular array may be somewhat less than a flat plate collector. In addition, as should be obvious from FIG. 1, the collection characteristics of a tubular array are somewhat independent of the actual position of the sun, since as the sun moves across the sky the sides and backs of the array may collect energy at one time of the day while the upper portion of it may collect energy during another part of the day. At all times, the direct beam $S_B$ which impinges upon a cylindrical collector sees a constant intercept area thus allowing maximum transfer of the solar energy. Despite this advantage, when solar collectors are made in a tubular array, shadowing effects can occur from adjacent collectors when the sun is low on the horizon thus reducing the efficiency and overall energy-absorption properties of such an array. In FIG. 1, a plurality of tubular collectors 10A–10C are shown as receiving solar energy. The tubular collectors are shown in greater detail in FIG. 2 and will be discussed with respect to FIG. 2. Suffice it to say at the moment that the tubular collectors 10A–10C can absorb solar energy with the use of a heat transfer media and transmit this energy to a location for use in space heating and cooling of a building, water heating for domestic purposes or for powering solar engines. In order to increase the efficiency of the tubular array, a back plate 12 is positioned behind the tubular collectors 10A–10C. The back plate 12 has its surface that faces the tubular collectors 10A–10C coated with a diffuse-reflecting material, such as white paint. This is a very thin layer and is exaggerated in FIG. 1 for purposes of illustration. Reflecting surfaces behind solar collector arrays are known in the art. However, these surfaces have normally been polished surfaces, and even more frequently have been focusing surfaces which attempted to focus those direct beams $S_B$ which missed a collector back to the collector. Polished surfaces and focusing surfaces suffer from fabrication difficulties which raise the expense of a solar collector array. In addition, exposure to the elements for a period of time causes polished surfaces to generally lose their polished sheen and would, therefore, cause focused-type surfaces to lose the precision of focus which is necessary for most efficient operation of such collector arrays. It is well known to place a single tubular collector at the focal point of a parabolic reflector. However, as pointed out, over a period of time such a reflector would begin to dull and lose its initial effective reflecting properties. In addition, such an array requires that the focusing parabola track the position of the sun to ensure that maximum energy is imparted to the tubular collector. There are also known low concentration parabolic collectors which do not require tracking, but these do not collect the maximum available energy. My invention utilizes a tubular array of solar collectors 10A–10C which need not be moved in order to absorb maximum solar energy. A diffuse-reflecting layer 14 on the back plate 12 reflects back any collimated beams $S_n$ or diffuse beams $S_D$ which impact upon it in a diffuse pattern as seen in FIG. 1. There is no attempt made to focus the reflection of any beams of light which are incident upon the layer 14 to any particular one of the tubular collectors 10A–10C. Rather, there is a random back reflection of light incident upon the layer 14 to all of the tubular collectors 10A–10C which are positioned above the back plate 12. The tubular collectors 10A–10C are positioned a distance A above the diffuse layer 14. The distance A may usually be defined in terms of the outside or overall diameter D of the tubular collectors 10. Likewise, the tubular collectors 10 themselves have a center line spacing which is generally designated as B. There are a set of relationships which inter-relate the distances A and B with the diameter of the tubes D to achieve maximum energy-absorption from a tubular collector array. These relationships will be discussed later.

Figure 2:
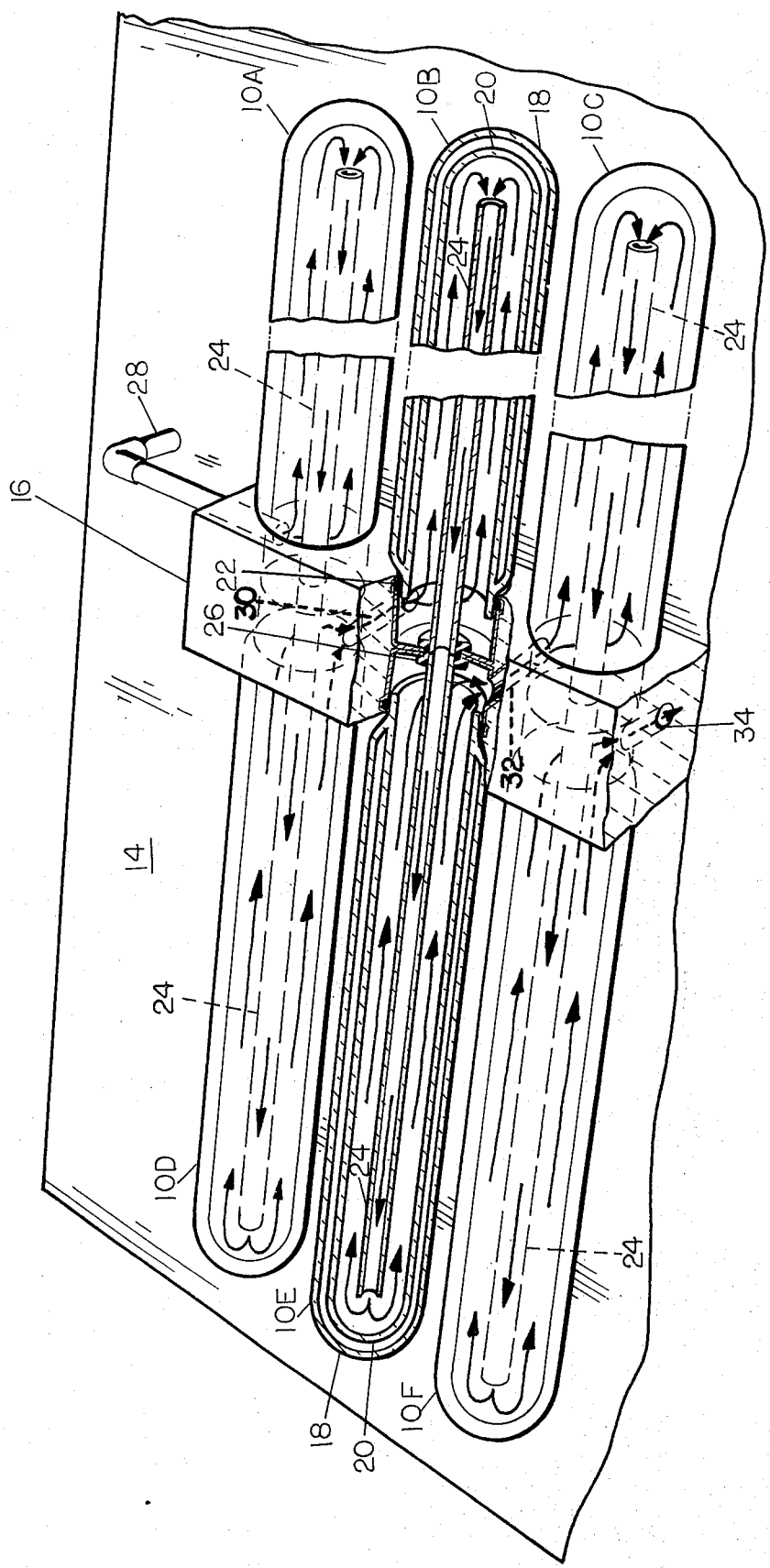
FIG. 2 is a perspective view, partially cut away, illustrating one embodiment of the present invention.

FIG. 2 illustrates one type of tubular collector array to demonstrate practical application of my invention. The tubular collector array shows six tubular collectors 10A through 10F. The tubular collectors 10 are mounted on each side of a manifold 16. In FIG. 2, the manifold 16 is positioned transversely to the pitch of a roof, which includes the diffusely-reflecting surface 14, on which the collector array would be mounted. Thus, the tubes 10D, 10E and 10F would be "down" relative to the tubes 10A, 10B and 10C. This relationship is important if the working fluid is a liquid to prevent air locks and to allow the use of gravity flow whenever possible to keep pumping pressures low. All of the tubular collectors 10A through 10F are identical in construction and the collectors 10B and 10E have been shown completely in cross section in order to explain the structure of the collectors. An outer transparent glass tube 18 has one closed end which extends beyond the manifold 16 and an open end which is adjacent to the manifold 16. The tube 18 is completely transparent around its entire circumference to allow maximum collection of solar radiation. This differs from such tubes in the prior art which were generally at least partially mirrored or coated in some manner. An inner tube 20 is sealed to the outer tube 18 near the open end of the outer tube 18. The inner tube 20 may be glass, but also could be a metal tube. The inner tube 20 may be blackened or provided with an overall selectively absorbing coating to absorb the solar energy. The space between the tubes 18 and 20 is evacuated or reduced to subatmospheric pressure to reduce conduction and convection losses from the collector. The open end of the inner tube 20 is in sealing engagement with an opening in the manifold 16 in a gasket 22. Note that while the inner tube 20 is shown as sealed in the manifold 16, in practice either the outer tube 18 or the inner tube 20 could be sealed in the manifold 16. In most general terms, the tubes 18 and 20 form a doublewall tubular member with a closed end remote from the manifold 16 and an open end in sealing engagement with the manifold 16. A cross-connecting tube 24 extends from a position adjacent the closed end of the inner tube 20 of the collector 10B to a position adjacent the closed end of the inner tube 20 of the collector 10E. The collectors 10B and 10E are in communication only through the cross-connecting tube 24, and the cross-connecting tube 24 is mounted in a gasket 26 within the manifold 16 to ensure that the only path available for fluid travel is along or through the cross-connecting tube 24. The cross-connecting tube 24 may be either a glass or a metal tube material. The working fluid to be heated by solar energy enters the manifold through an inlet line 28. The fluid is first directed along the length of the tubular collector 10A around the outside of the cross-connecting tube 24 which connects the tubular collectors 10A and 10B. The fluid flows down the length of the cross-connecting tube 24 and into the tubular collector 10D. During this passage and during the time it is in the collector 10A the fluid has been heated by extracting energy from the absorber surface. As the fluid reaches the open end of the tubular collector 10D and enters the manifold, a cross-connecting passage 30 formed in the manifold 16 directs the fluid into the open end of the tubular collector 10B. The fluid then flows along the length of the tube 10B and along the cross-connecting tube 24 which connects the tubes 10B and 10E and enters the cross-connecting tube 24 at the closed end of the tubular collector 10B. Fluid flows down the length of the tube 24 and into the tubular collector 10E. The fluid then passes back along the length of the tubular collector 10E and once again enters the manifold 16. A second cross-connecting passage 32 directs the fluid into the open end of the tubular collector 10C. The path of the fluid is identical for that previously described with respect to the collectors 10A, 10B, 10D and 10E with respect to the collectors 10C and 10F. That is, the fluid goes down the length to the collector 10C, enters the cross-connecting tube 24, exits into the collector 10F and then flows back into the manifold 16. The fluid coming from the tubular collector 10F may be utilized at this point for its energy content by removing it from the manifold 16 through a passage 34. If desired, however, the working fluid may be passed through still further tubular collectors and additional solar energy collected before the fluid is utilized. The example of FIG. 2 is simply one form of tubular collector which may be used to obtain significant solar energy. A system which uses parallel flow as opposed to the series flow shown in FIG. 2, could also be successfully utilized. The major parameters are that the spacing of the tubular collectors 10A through 10F be properly selected and that the diffuse layer 14 reflect light back to the tubular collectors 10A through 10F in a diffuse manner rather than in a specular manner, keeping in mind factors such as (1) best back-reflecting properties; (2) best use of incident diffuse light; and (3) best symmetry effect for direct light.

Figure 3:
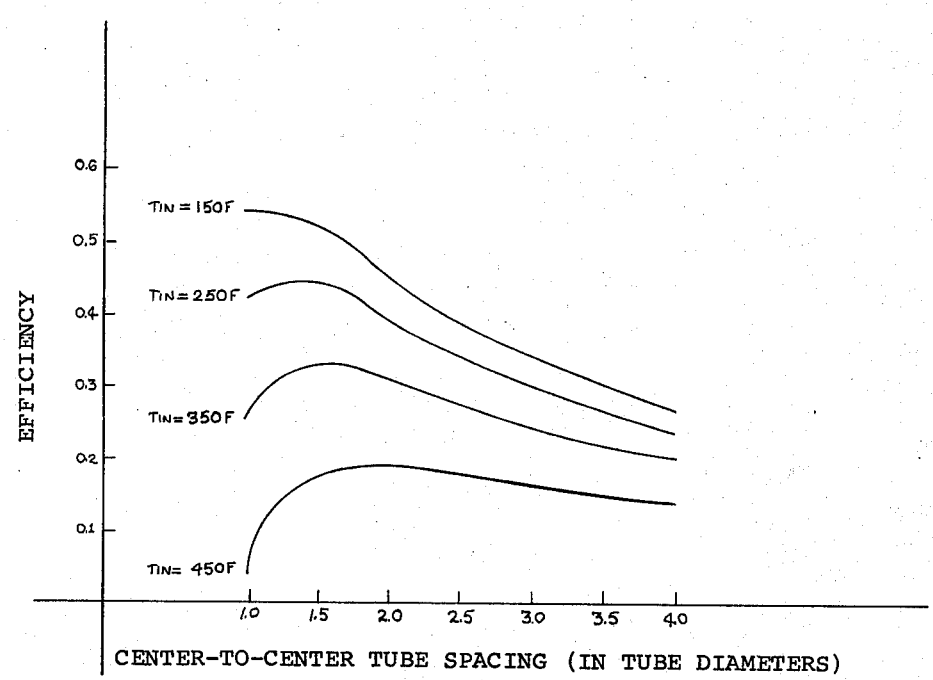
FIG. 3 is a chart of efficiency versus tube to tube spacing for a series of inlet fluid temperatures.
Figure 4:
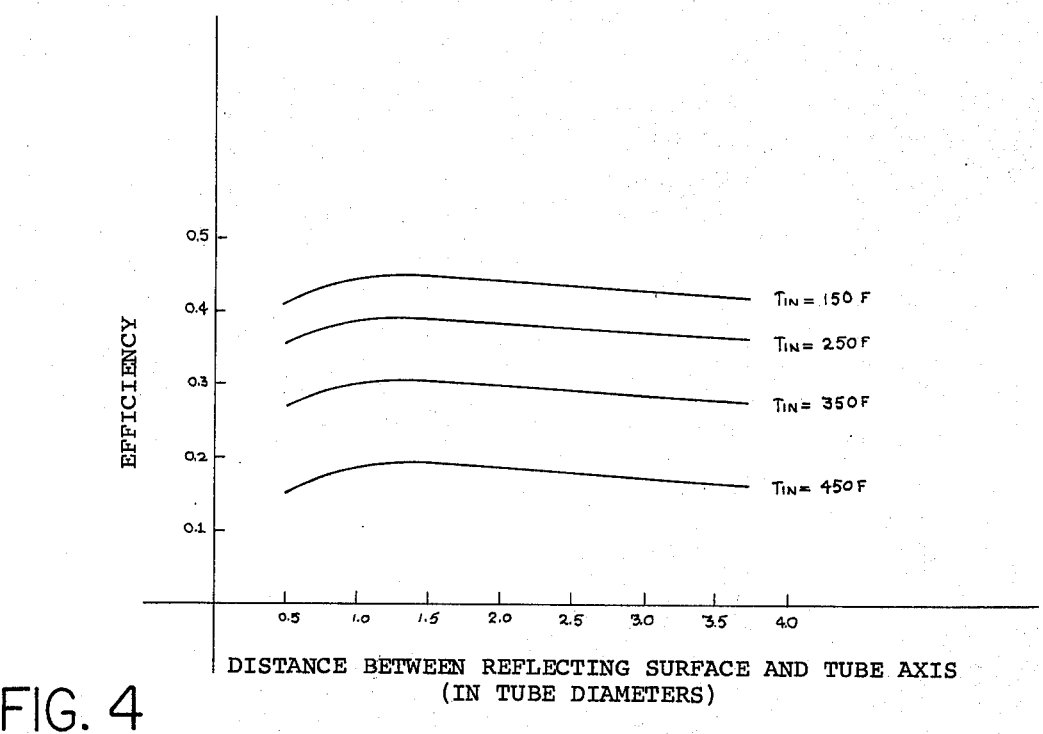
FIG. 4 is a chart of efficiency versus tube distance from the diffusely-reflecting surface for a series of inlet fluid temperatures.

FIGS. 3 and 4 are charts showing performance data for a multiple tube solar energy collector such as that illustrated in FIG. 2. A diffuse-reflecting layer 14 was used behind the solar energy collector array in all cases. FIGS. 3 and 4 illustrate that there is a preferred range of spacings of the tubes from one another and from the diffuse-reflecting surface 14. All of the data in FIGS. 3 and 4 were taken at an ambient temperature of 77° F. and at solar noon. In addition, the data in FIGS. 3 and 4 do not include any component from diffuse sunlight. Thus the actual curves shown in FIGS. 3 and 4 would be shifted somewhat to the right of the axis shown in FIGS. 3 and 4 if the diffuse component were added. In addition, the symmetry factor is likewise not included in FIGS. 3 and 4. The symmetry factor of a multiple tube array becomes more important with increased tube spacing and would also have a tendency to shift the total curves somewhat to the right. However, the curves illustrated in FIGS. 3 and 4 are sufficient to clearly demonstrate that there is indeed a preferred range for tube spacing both one to another and from the diffuse back-reflecting surface 14. In FIG. 3, a series of curves are shown for various inlet working fluid temperatures. In FIG. 3, the distance of the tubular array from the back-reflecting surface 14 was retained constant at a spacing of about one and one-half tube diameters. Note that as the center to center tube spacing, as expressed in tube diameters, increases, the efficiency of the collector rises, reaches a maximum and then begins to decrease. This is true in all cases except for the low temperature case of 150° F. inlet temperature. This effect becomes more marked as the inlet temperature of the working fluid increases. It is therefore clear that there is a peak efficiency reached somewhere between 1.5 and 2 tube diameters spacing. However, as was previously noted, symmetry effects and diffuse radiation effects would dictate that this value be shifted somewhat to a range of about 2 to 2.5 tube diameters for preferred spacing. The range actually extends outward until about four tube diameters which is considered to be the maximum tube center to center tube spacing that would be practical and still allow significant collection of solar energy with a reasonable size collector array. In FIG. 4, the test conditions were maintained the same as in FIG. 3. However, in FIG. 4 the spacing of the tubular array was held constant at two tube diameters. The distance of the array above the diffuse-reflecting surface 14 was then varied as a function of the tube diameters. Again note that there is a rise in efficiency to a maximum at about two tube diameters away from the diffuse-reflecting surface with the efficiency then beginning to drop off from that point. As was the case with the tube to tube spacing, the maximum practical spacing is believed to be about four tube diameters away from the diffuse-reflecting surface 14. Under some conditions, the entire tubular array might be inclined with respect to the surface upon which it is mounted. In this case, the uppermost portion of the tubular collectors could be more than four tube diameters away from the diffuse-reflecting surface. However, the average spacing of the entire length should still be kept to within four tube diameters. The total energy flux represented by FIGS. 3 and 4 is about 300 B.T.U.'s per hour per square foot which is approximately 1.1 Langleys per minute.

What I claim is:

1. A solar energy collector which comprises:
   a manifold;
   a plurality of double-wall tubular members, the space between said double walls being sealed at a subatmospheric pressure, each having a closed end remote from said manifold and an open end in sealing engagement with said manifold, the outer wall of said double-wall member being a transparent glass material and is transparent about its entire circumference, said double-wall tubular members being spaced apart on centers no more than four times the diameter of said tubular members;
   means for supplying a working fluid from said manifold to the interior of said plurality of tubular members and returning said working fluid to said manifold; and
   a diffuse-reflecting surface positioned on the side of said tubular members away from the sun and being coextensive with all of said tubular members, said diffuse-reflecting surface being positioned a distance no more than four times the diameter of said tubular members away from the center line of said tubular members.

2. The solar energy collector of claim 1 which further includes:
   an energy-absorbing, opaque coating covering substantially an entire surface of the inner walls of each one of said double-wall tubular members.

3. The solar energy collector of claim 1 wherein said means for supplying a working fluid includes:
   a plurality of tubes, communicating with said manifold, extending in coaxial relationship within the interior of each of said plurality tubular members to a location adjacent the closed ends of said tubular members.

4. The solar energy collector of claim 3 wherein said plurality of tubes are comprised of glass.

5. A solar energy collector for a building with an inclined roof structure which comprises, in combination:
   a manifold mounted on said roof structure transversely to said roof structure;
   a first plurality of double-wall tubular members, the space between said double walls being sealed at a sub-atmospheric pressure, each having a closed end remote from said manifold and an open end in sealing engagement with the side of said manifold toward the peak of said roof structure, the outer wall of said double-wall tubular member being a transparent glass material and being transparent about its entire circumference, said first plurality double-wall tubular members being spaced apart on centers no more than four times the diameter of said first plurality of tubular members;
   a second plurality of double-wall tubular members, the space between said double walls being sealed at a sub-atmospheric pressure, each having a closed end remote from said manifold and an open end in sealing engagement with the side of said manifold toward the ground, the outer wall of said double-wall tubular members being a transparent glass material and being transparent about its entire circumference, said second plurality of double-wall tubular members being spaced apart on centers no more than four times the diameter of said second plurality of tubular members;
   means for supplying a working fluid from said manifold to the interior of said first and second plurality of tubular members and returning said working fluid to said manifold; and
   a diffuse-reflecting surface on said roof structure below said manifold and said first and second plurality of tubular members, said diffuse-reflecting surface being co-extensive with all of said tubular members and being positioned a distance no more than four times the diameter of said first or second plurality of tubular members away from the center line of said first and second plurality of tubular members.

6. The solar energy collector of claim 5 which further includes:
an energy-absorbing, opaque coating covering substantially an entire surface of the inner walls of each one of said first and second plurality of tubular members.

7. The solar energy collector of claim 5 wherein said means for supplying a working fluid includes:
a plurality of tubes, communicating with said manifold, extending in coaxial relationship within the interior of each of said first and second plurality of tubular members to a location adjacent the closed ends of said tubular members.

* * * * *